US012778346B2

(12) United States Patent
Tseng et al.

(10) Patent No.: US 12,778,346 B2
(45) Date of Patent: Nov. 3, 2026

(54) COFFEE GRINDER APPARATUS AND ION GENERATOR THEREFOR

(71) Applicant: c/o Acaia Corporation, Alhambra, CA (US)

(72) Inventors: Rex Poway Tseng, Taipei (TW); Chien-Chun Han, Taipei (TW)

(73) Assignee: Acaia Corporation, Alhambra, CA (US)

( * ) Notice: Subject to any disclaimer, the term of this patent is extended or adjusted under 35 U.S.C. 154(b) by 299 days.

(21) Appl. No.: 18/633,851

(22) Filed: Apr. 12, 2024

(65) Prior Publication Data

US 2024/0349944 A1 Oct. 24, 2024

Related U.S. Application Data

(60) Provisional application No. 63/497,521, filed on Apr. 21, 2023.

(51) Int. Cl.

*A47J 42/38* (2006.01)
*A47J 42/40* (2006.01)
*A47J 42/50* (2006.01)
*H05F 3/06* (2006.01)

(52) U.S. Cl.

CPC ............... *A47J 42/38* (2013.01); *A47J 42/40* (2013.01); *A47J 42/50* (2013.01); *H05F 3/06* (2013.01)

(58) Field of Classification Search

CPC .. A47J 42/38; A47J 42/40; A47J 42/50; H05F 3/06

See application file for complete search history.

(56) References Cited

U.S. PATENT DOCUMENTS

| | | | | |
|---|---|---|---|---|
| 10,201,248 | B2 | 2/2019 | Bakke et al. | |
| 11,259,665 | B2 | 3/2022 | Hulett et al. | |
| 11,304,564 | B2 | 4/2022 | Nicholson | |
| 2013/0189400 | A1 | 7/2013 | Pribus et al. | |
| 2017/0223813 | A1 * | 8/2017 | Wu | G06F 1/16 |
| 2023/0017935 | A1 | 1/2023 | Kuempel et al. | |

FOREIGN PATENT DOCUMENTS

| | | | | | |
|---|---|---|---|---|---|
| CN | 205864831 | U | * | 1/2017 | |
| CN | 218390827 | U | * | 1/2023 | |
| CN | 116174117 | B | * | 5/2024 | B02C 19/00 |
| JP | 2009144968 | A | * | 7/2009 | |
| JP | 2016214619 | A | | 12/2016 | |
| KR | 102038089 | B1 | | 10/2019 | |
| KR | 20220108661 | A | | 8/2022 | |

OTHER PUBLICATIONS

Harper, et al., "Chemical strategies to mitigate electrostatic charging during coffee grinding", arXiv:2312.03103v3, 2023, 18 pages.

* cited by examiner

*Primary Examiner* — Christopher L Templeton
*Assistant Examiner* — Darlington N Ibekwe
(74) *Attorney, Agent, or Firm* — Dority & Manning, P.A.

(57) ABSTRACT

A grinder apparatus may include a grinder body, a burr set, and an ion generator. The grinder body may define an intake passage to receive coffee beans therein and an outlet aperture. The burr set may be disposed within the grinder body in fluid communication between the intake passage and the outlet aperture to grind the coffee beans into coffee grounds output at the outlet aperture. The ion generator may be attached to the grinder body to produce ions therefor. The ion generator may include an ion source in fluid communication with the grinder body.

18 Claims, 8 Drawing Sheets

COFFEE GRINDER APPARATUS AND ION GENERATOR THEREFOR

PRIORITY CLAIM

The present application claims the benefit of priority of U.S. Provisional Application Ser. No. 63/497,521, filed Apr. 21, 2023, titled "Ion Beam Generator For Coffee Making," which is incorporated by reference in its entirety and for all purposes.

FIELD OF THE DISCLOSURE

The present subject matter relates generally to a machine for grinding coffee beans, including methods of operating the same.

BACKGROUND OF THE DISCLOSURE

Coffee, in its many forms and according to numerous brewing methods, is one of the most popular beverages throughout the world. Typical brewing methods broadly include immersion and percolation. In either case, coffee beans are ground into a powder (i.e., coffee grounds) before being introduced to water in order to extract various chemical compounds and flavors to create a coffee beverage.

Numerous devices exist for grinding coffee beans in both commercial and residential settings (i.e., coffee grinders). Generally, there are different types of coffee grinders, such as blade and burr grinders. Blade grinders use a motor and spinning blades to chop up the coffee beans. They are typically less expensive, but they tend to produce inconsistent grinds due to the unevenness of the chopping action. Burr grinders use two revolving abrasive surfaces, known as burrs, to crush the coffee beans into uniform particles. They offer more control over the grind size and produce more consistent grinds.

Various drawbacks of existing systems are linked to the generation of an electrostatic charge or static electricity when a coffee bean is broken. Specifically, static electricity is generated by friction between different materials, where the polarity of the charge depends on the materials involved and their relative position in the triboelectric series (e.g., a list of materials ranked by their tendency to generate a positive or negative charge). Static electricity may, additionally or alternatively, be generated by the breaking on the beans, which may be described as fractoelectrification.

In the case of a coffee grinder, the polarity of the charge depends on the beans themselves, the material of the grinders, and other factors. For example, light roast beans have a shorter roasting time, and may have more water content than dark roast beans. As a result, the coffee grounds can become differently charged. In many instances, a receptacle (e.g., cup or portafilter) can be used to collect the coffee grounds from a grinder. However, the coffee ground can adhere to the receptacle due to the static electricity, and cling to the surface of the receptacle. Moreover, lightweight coffee grounds may disperse as they exit the grinder, making it difficult to collect them in the receptacle. Along with being messy and a potential waste of coffee grounds, the adhered or dispersed coffee may contaminate future grounds or lead to other deleterious effects. Additionally or alternatively, static electricity in the coffee grounds may contribute to poor extraction or taste of a brewed coffee beverage, such as by the formation of aggregates (e.g., colloquially described "electroclumps") of charged grounds, which may be created by the accumulation of several charged (e.g., negative or positive) particles on an oppositely charged (e.g., positive or negative) particle and which may be especially impactful in the case of espresso brewing—such as by increasing the risk of channeling.

BRIEF DESCRIPTION OF THE DISCLOSURE

Aspects and advantages of the disclosure will be set forth in part in the following description, or may be obvious from the description, or may be learned through practice of the disclosure.

In one exemplary aspect of the present disclosure, a grinder apparatus is provided. The grinder apparatus may include a grinder body, a burr set, an ion generator, and an ion fan. The grinder body may define an intake passage to receive coffee beans therein and an outlet aperture. The burr set may be disposed within the grinder body in fluid communication between the intake passage and the outlet aperture to grind the coffee beans into coffee grounds output at the outlet aperture. The ion generator may be attached to the grinder body to produce ions therefor. The ion generator may include an ion source in fluid communication with the grinder body. The ion fan may be in fluid communication with the ion source to motivate the ions therefrom.

In another exemplary aspect of the present disclosure, a grinder apparatus as described in any one of the other aspects described herein is provided, wherein the ion fan may be disposed upstream from the outlet aperture.

In another exemplary aspect of the present disclosure, a grinder apparatus as described in any one of the other aspects described herein is provided, wherein the ion generator may be disposed upstream from the burr set to provide the ions to the received coffee beans.

In another exemplary aspect of the present disclosure, a grinder apparatus as described in any one of the other aspects described herein is provided, wherein the grinder body may define an inlet aperture upstream from the intake passage and through which the coffee beans are received. The ion generator may define an airflow passage outside of the grinder body and in fluid parallel to the inlet aperture upstream from the outlet aperture to direct the ions to the grinder body apart from the inlet aperture.

In another exemplary aspect of the present disclosure, a grinder apparatus as described in any one of the other aspects described herein is provided, wherein the ion fan may be disposed along the airflow passage.

In another exemplary aspect of the present disclosure, a grinder apparatus as described in any one of the other aspects described herein is provided, wherein the ion source may be disposed along the airflow passage.

In another exemplary aspect of the present disclosure, a grinder apparatus as described in any one of the other aspects described herein is provided. The grinder apparatus may further include a controller operably connected to the ion fan. The controller may be configured to control a rotational speed of the ion fan from a plurality of rotational speeds between discrete maximum and minimum rotational speeds.

In another exemplary aspect of the present disclosure, a grinder apparatus as described in any one of the other aspects described herein is provided. The grinder apparatus may further include an ion sensor disposed downstream from the burr set to detect polarity of the coffee grounds.

In another exemplary aspect of the present disclosure, a grinder apparatus as described in any one of the other aspects described herein is provided. The grinder apparatus may further include a controller operably connected to the ion sensor and the ion generator. The controller may be configured to control a polarity of the ions produced by the ion generator based on the detected polarity of the coffee grounds.

In another exemplary aspect of the present disclosure, a grinder apparatus as described in any one of the other aspects described herein is provided, wherein a controller is configured to dynamically control one or more properties associated with the ions based on detection outputs of the ion sensor over time. The one or more properties may include the polarity of the ions, a flow rate of the ions, or an amount of the ions produced by the ion generator.

In another exemplary aspect of the present disclosure, a grinder apparatus as described in any one of the other aspects described herein is provided. The grinder apparatus may further include a controller operably connected to the ion sensor and the ion generator. The controller may be configured to determine one or more properties associated with the coffee beans, and control a polarity of the ions produced by the ion generator based on the determined one or more properties. The one or more properties may include a bean type of the coffee beans or a water content of the coffee beans.

In another exemplary aspect of the present disclosure, a grinder apparatus is provided. The grinder apparatus may include a grinder body, a burr set, and an ion generator. The grinder body may define an intake passage to receive coffee beans therein and an outlet aperture. The burr set may be disposed within the grinder body below the intake passage and upstream from the outlet aperture to grind the coffee beans into coffee grounds output at the outlet aperture. The ion generator may be attached to the grinder body to produce ions. The ion generator may include an ion source in fluid communication with the intake passage to produce ions introduced with the received coffee beans.

In another exemplary aspect of the present disclosure, a grinder apparatus as described in any one of the other aspects described herein is provided. The grinder apparatus may further an ion fan disposed upstream from the outlet aperture and in fluid communication with the ion source to motivate the ions therefrom.

In another exemplary aspect of the present disclosure, a grinder apparatus as described in any one of the other aspects described herein is provided. The grinder apparatus may further include an ion sensor disposed downstream from the burr set to detect polarity of the coffee grounds. The ion generator may be configured to select a polarity of the ions based on the detected polarity of the coffee grounds.

In another exemplary aspect of the present disclosure, an apparatus that generates one or more types of ion beam to neutralize static electricity on coffee grounds is provided. The apparatus may include an elongated body, an ion source, a power supply, a vacuum system, and ion optics. The elongated body may have a first distal end and a second distal end. The ion source may be configured to emit positive ions and negative ions. The vacuum system may include a vacuum chamber that may be configured to transport the positive ions or the negative ions. The ion optics may be configured to output one or more ion beams using the positive ions and the negative ions. At least one of the one or more ion beams may be directed towards the coffee ground.

In another exemplary aspect of the present disclosure, an apparatus as described in any one of the other aspects described herein is provided, wherein the apparatus may be configured to generate the negative ions through the first distal end and the positive ions through the second distal end.

In another exemplary aspect of the present disclosure, an apparatus as described in any one of the other aspects described herein is provided. The apparatus may further include an electric field generator, which may be configured to create an electric field along the elongated body to separate the positive ions and the negative ions to the respective first and second distal end.

In another exemplary aspect of the present disclosure, an apparatus as described in any one of the other aspects described herein is provided. The apparatus may further include a brush tip on the first distal end.

In another exemplary aspect of the present disclosure, an apparatus as described in any one of the other aspects described herein is provided. The apparatus may further include a metal tip on the first distal end.

In another exemplary aspect of the present disclosure, an apparatus as described in any one of the other aspects described herein is provided, wherein the ion source may include tungsten, graphite, or ceramics.

In another exemplary aspect of the present disclosure, an apparatus as described in any one of the other aspects described herein is provided, wherein the power supply may be configured to provide energy to accelerate the positive and negative ions to a threshold speed.

In another exemplary aspect of the present disclosure, an apparatus as described in any one of the other aspects described herein is provided, wherein the ion optics may include electrostatic lenses.

In another exemplary aspect of the present disclosure, an apparatus as described in any one of the other aspects described herein is provided. The apparatus may further include an electric charge detector, which may be configured to detect a type of static charge outside the apparatus and provide a detection output.

In another exemplary aspect of the present disclosure, an apparatus as described in any one of the other aspects described herein is provided. The apparatus may further include a display, which may be configured to output a visual output indicating the type of static charge outside the apparatus.

In another exemplary aspect of the present disclosure, an apparatus as described in any one of the other aspects described herein is provided. The apparatus may further include a control circuitry. The control circuitry may be configured to control an output of the one or more ion beams based on a detection output from the electric charge detector.

In another exemplary aspect of the present disclosure, an apparatus as described in any one of the other aspects described herein is provided, wherein controlling the output of the one or more ion beams may further include in response to detecting negative static charges outside the apparatus. Control circuitry may be configured to switch a direction of an electric field inside the apparatus to emit a positive ion beam.

In another exemplary aspect of the present disclosure, an apparatus as described in any one of the other aspects described herein is provided, wherein controlling the output of the one or more ion beams may further include dynamically adjusting a polarity of the ion beam emitting from the first distal end based on the detection output.

In another exemplary aspect of the present disclosure, an apparatus as described in any one of the other aspects described herein is provided, wherein the electric charge detector may further be configured to detect a balance between the static charge and emitted ions in the environment. Controlling the output of the one or more ion beams may further include emitting a proper composition of ions based on the detected balance.

In another exemplary aspect of the present disclosure, an apparatus as described in any one of the other aspects described herein is provided. The apparatus may further include a timer. The timer may be configured to stop an emission of the one or more ion beams after a predetermined time period.

In another exemplary aspect of the present disclosure, an apparatus as described in any one of the other aspects described herein is provided. The apparatus may further include a remote control element. The remote control element may be configured to communicate with an external device and to control an operation of the apparatus in response to the communication.

In another exemplary aspect of the present disclosure, an apparatus as described in any one of the other aspects described herein is provided, wherein the external device comprises one or more of a coffee grinder or a smartphone.

In another exemplary aspect of the present disclosure, an apparatus as described in any one of the other aspects described herein is provided. The apparatus may further include one or more fixtures configured to attach to a coffee grinder.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present disclosure, including the best mode thereof, directed to one of ordinary skill in the art, is set forth in the specification, which makes reference to the appended figures.

Figure 1:
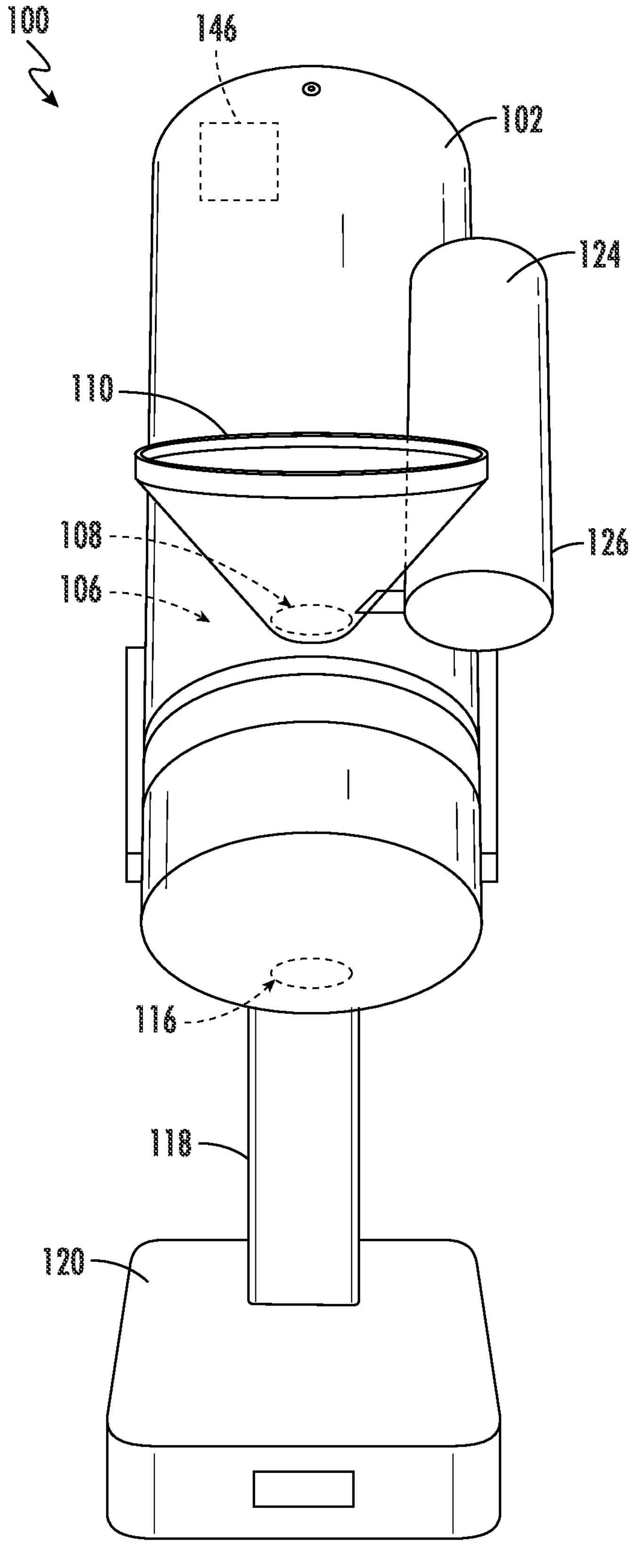
FIG. 1 provides a perspective view of a grinder apparatus according to exemplary embodiments of the present disclosure.

Repeat use of reference characters in the present specification and drawings is intended to represent the same or analogous features or elements of the present disclosure.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope of the disclosure. For instance, features illustrated or described as part of one embodiment can be used with another embodiment to yield a still further embodiment. Thus, it is intended that the present disclosure covers such modifications and variations as come within the scope of the appended claims and their equivalents. The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

Except as explicitly indicated otherwise, recitation of a singular processing element (e.g., "a controller," "a processor," "a microprocessor," etc.) is understood to include more than one processing element. In other words, "a processing element" is generally understood as "one or more processing element." Furthermore, barring a specific statement to the contrary, any steps or functions recited as being performed by "the processing element" or "said processing element" are generally understood to be capable of being performed by "any one of the one or more processing elements." Thus, a first step or function performed by "the processing element" may be performed by "any one of the one or more processing elements," and a second step or function performed by "the processing element" may be performed by "any one of the one or more processing elements and not necessarily by the same one of the one or more processing elements by which the first step or function is performed." Moreover, it is understood that recitation of "the processing element" or "said processing element" performing a plurality of steps or functions does not require that a single discrete processing element be capable of performing each one of the plurality of steps or functions.

Aspects of the present disclosure may provide a grinder apparatus (e.g., coffee grinder) capable of mitigating static electricity (or the effects thereof) during grinding operations. Additional or alternative aspects of the present disclosure may provide a grinder apparatus capable of preventing coffee waste, mess, or the undesirable accumulation of grounds within the grinder apparatus during grinding operations (e.g., without requiring direct user input or the performance of manual cleaning steps by a user). It may be useful to provide a grinder apparatus in which electrically charged grounds within the grinder apparatus are prevented or reduced consistently and reliably (e.g., even after a number of grinding operations).

Turning now to the figures, FIG. 1 provides a perspective view of a grinder apparatus 100 according to exemplary embodiments of the present disclosure. Generally, the grinder apparatus 100 includes a grinder body 102 and a burr set 104 (FIG. 2) disposed therein to selectively grind coffee beans (e.g., to generate coffee grounds for brewing). The grinder body 102 defines at least one intake passage 106 to receive coffee beans therein (e.g., prior to grinding at the burr set 104). Specifically, the intake passage 106 may be defined within the grinder body 102 upstream, at least in part, from the burr set 104. Upstream from or above the intake passage 106, the grinder body 102 may further define an inlet aperture 108 or opening in the grinder body 102 through which coffee bean may be received (e.g., before traveling inside the grinder body 102 and to the intake passage 106). In some embodiments, a hopper or feeder cup 110 may be provided on the grinder body 102 proximal to the inlet aperture 108. For instance, the feeder cup 110 may be provided above the intake passage 106 or otherwise upstream from the intake passage 106 such that coffee beans can be delivered to the feeder cup 110 and directed (e.g., by gravity) to the intake passage 106.

Figure 2:
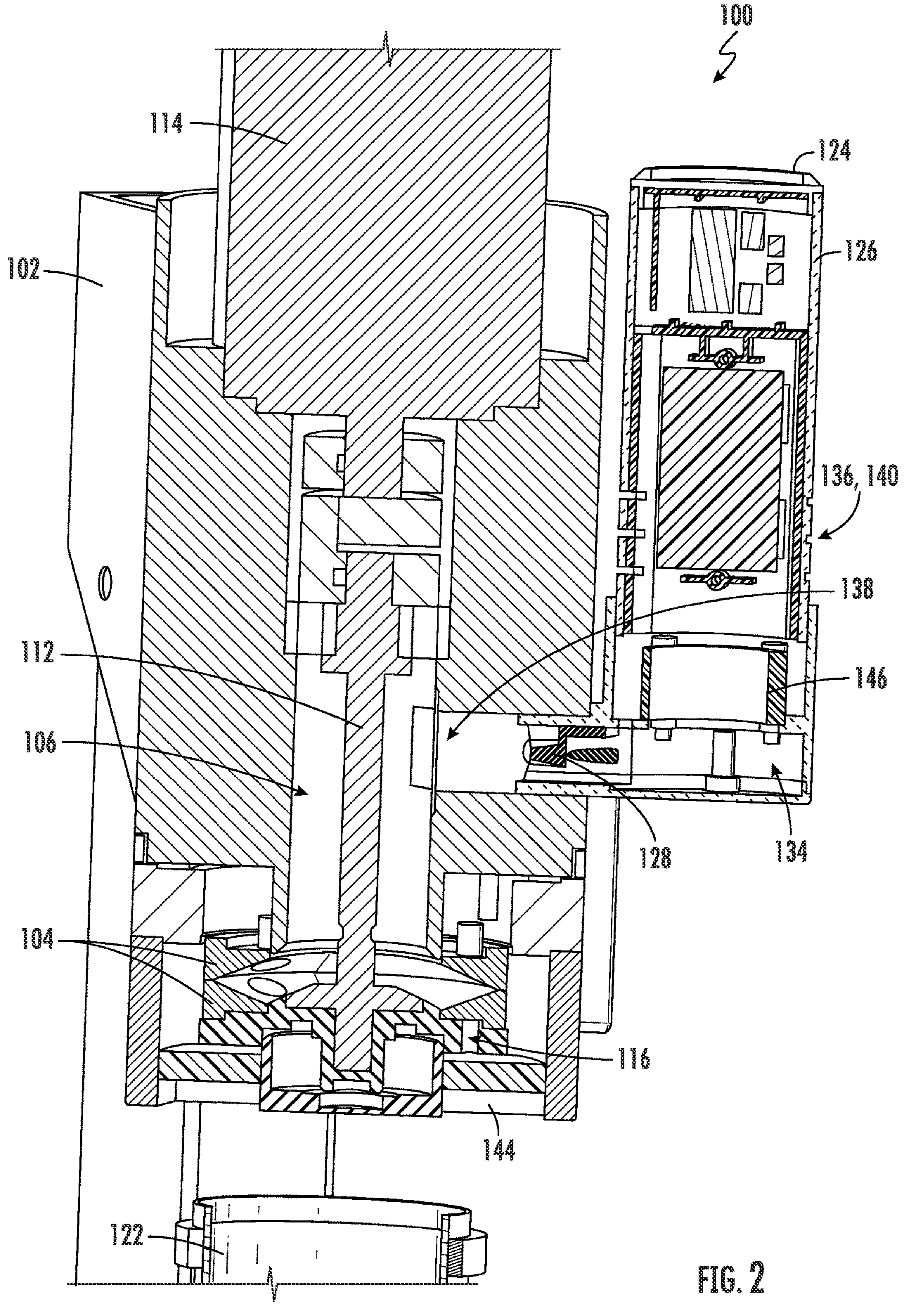
FIG. 2 provides a sectional perspective view of a portion of a grinder apparatus according to exemplary embodiments of the present disclosure.

Turning briefly to FIG. 2, the intake passage 106 may define the passage or path along which coffee beans are guided before reaching the burr set 104. In the illustrated embodiments, a driveshaft 112 further extends within the intake passage 106 from a grinder motor 114 supported on or within the grinder body 102. As shown, the driveshaft 112 is mechanically coupled or attached to at least one burr (e.g., driven burr) of the burr set 104. During use, the grinder motor 114 may thus be selectively activated to motivate or rotate the driven burr (e.g., via the driveshaft 112) relative to a static burr.

It is noted that although a pair of circular "flat" burrs are illustrated in the figures, any suitable type or configuration of burrs may be provided, such as a conical burr configuration, as would be understood.

Returning generally to FIGS. 1 and 2, downstream from the intake passage 106, the grinder body 102 may define one or more outlet apertures 116. Specifically, an outlet aperture 116 may be defined downstream from or below the burr set 104. The coffee grounds generated from coffee beans at the burr set 104 may, thus, be output at the outlet aperture 116.

In the illustrated embodiments, the grinder body 102 is supported on a pedestal or support frame 118 including a platform 120 disposed below the outlet aperture 116. During use, a receptacle 122 (FIG. 2), such as a catch cup or portafilter, may be selectively placed or disposed on the platform 120 to receive coffee grounds output through the outlet aperture 116.

Figure 3:
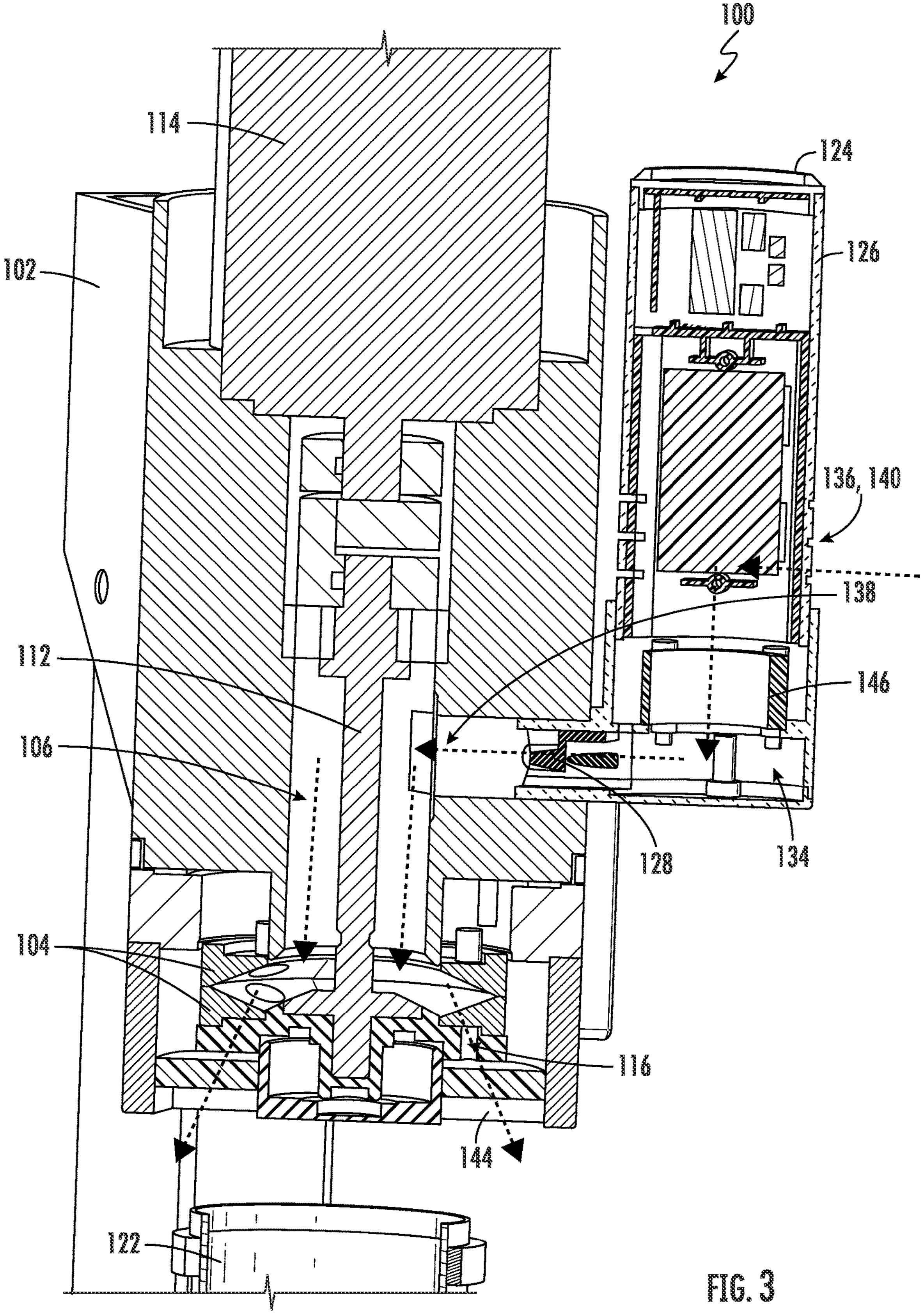
FIG. 3 provides another sectional perspective view of a portion of an exemplary grinder apparatus, wherein airflow is illustrated for clarity.

Referring generally to FIGS. 1 through 3, an ion generator 124 may be attached to grinder body 102. For instance, ion generator 124 may be fixed to and supported on grinder body 102 apart from outlet aperture 116. As will be explained in greater detail below, ion generator 124 may be configured to produce ions for the grinder body 102. Specifically, the ion generator 124 includes an ion source 128 in fluid communication with the grinder body 102 such that ions (e.g., positive or negative ions) may be produced outside of the grinder body 102 (e.g., outside of the intake passage 106) and subsequently conveyed thereto.

In some embodiments, the ion generator 124 includes a body housing 126 the ion source 128. Further housed within the body 126 may be one or more optional sub-systems, such as a vacuum system or ion optics. As shown, an airflow passage 134 may be defined within the body housing 126. An air inlet 136 may be defined through the body housing 126 upstream from the airflow passage 134, such as to permit air thereto, while an air outlet 138 is defined through the body housing 126 downstream from the airflow passage 134. In the illustrated embodiments, the air inlet 136 includes a plurality of radial slots 140, though it is understood that any suitable opening shape may be provided (e.g., to permit air therethrough).

The ion source 128 may be disposed along or otherwise in fluid communication with the airflow passage 134. Moreover, the ion source 128 may be configured to produce ions or an ion beam, and can be made from various materials such as tungsten, graphite, or ceramics, as would be understood. In some embodiments, a heating element is provided on (or proximal to) the ion source 128 such that the ion source 128 may be heated to produce a stream of positive and negative ions. A voltage power supply may provide the energy necessary to accelerate the ions to high speeds (e.g., a threshold speed), which can be DC or AC supplied. A vacuum system may maintain a low-pressure environment inside the body to prevent interference from air molecules and to ensure that the ions can travel freely without colliding with other particles. In some implementations, the vacuum system includes a vacuum pump and one or more vacuum chambers configured to transport the positive ions or the negative ions. Ion optics may be used to manipulate (e.g., focus, collimate, etc.) an ion beam, which can include electrostatic lenses, which use electric fields to manipulate the ions, as is generally understood.

In certain embodiments, the ion generator 124 is disposed upstream from the outlet aperture 116. Thus, ions may flow to the intake passage 106 to neutralize electricity prior to grounds being dispensed. As shown, the ion generator 124 may even further be disposed upstream from the burr set 104 (e.g., to provide ions to the received coffee beans). For instance, the ion generator 124 may be attached to the grinder body 102 at the intake passage 106. Although both the ion generator 124 and the inlet aperture 108 may be in upstream fluid communication with the intake passage 106, the ion generator 124 may be disposed apart from the inlet aperture 108.

In the illustrated embodiments, an intermediary bracket is provided (e.g., as part of the grinder body 102) and supports the body of the ion generator 124. The intermediary bracket may define the inlet aperture 108 and a generator aperture 132 in fluid parallel with the inlet aperture 108 such that both may separate direct beans or ions, respectively, to the intake passage 106. For instance, the inlet aperture 108 may be offset from the generator aperture 132, which itself may be aligned with or downstream from the air outlet 138, as shown. During use, the airflow passage 134, which is defined outside of the grinder body 102 upstream from the outlet aperture 116 and in fluid parallel to the inlet aperture 108, may thus direct the ions to the grinder body 102 apart from the inlet aperture 108. Notably, ions provided by the ion generator 124 may neutralize or offset electricity otherwise generated during a grinding operation prior to the coffee grounds being output. In some embodiments, the introduction of ions prior to grinding may advantageously prevent the accumulation or clumping of grounds within the grinder body 102.

In some embodiments, the ion generator 124 includes an ion sensor 144, such an electric charge detector that is configured to detect the type of static charge (e.g., in the air or at a corresponding portion of the grinder apparatus 100). As an example, an ion sensor 144 may be disposed downstream from the burr set 104 (e.g., at or proximal to the outlet aperture 116) to detect polarity of the coffee grounds being dispensed. In the illustrated embodiments, the ion sensor 144 is disposed below the burr set 104. As an additional or alternative example, the ion sensor 144 may be disposed upstream from the burr set 104 (e.g., at or proximal to the intake passage 106, such as along the air outlet 138) to detect polarity within the intake passage 106.

The electric charge detector or ion sensor 144 may include one or more probes and detection circuitry. A probe is the sensing element used to collect electric charges from the surrounding air. For example, the probe may include a conductive (e.g., metal) pin or plate. The detection circuitry is configured to receive an electrical signal from the probe and to provide an output signal. For example, the detection circuitry may include an amplification circuitry such as operational amplifier (op-amp) or a field-effect transistor (FET) amplifier.

In exemplary embodiments, an ion fan 146 is provided in fluid communication with the ion generator 124. In particular, ion fan 146 may be rotatably disposed in fluid communication with the ion source 128 to motivate ions therefrom. For instance, the ion fan 146 may be disposed upstream from the outlet aperture 116. In turn, ions from the ion source 128 may notably be propelled or accelerated to interact with coffee grounds prior to the coffee grounds exiting the grinder apparatus 100. Additionally or alternatively, the coffee grounds may notably be agitated (e.g., to prevent the formation of aggregates or accumulation of coffee grounds within the grinder apparatus 100.

In certain embodiments, the ion fan 146 is further disposed upstream from the burr set 104 or intake passage 106. For instance, the ion fan 146 may be disposed along the airflow passage 134. Ions may thus be propelled to interact with coffee beans prior to being ground. Moreover, ion fan 146 may notably be held outside of intake passage 106 and avoid directly contacting the falling of coffee beans to the burr set 104.

Generally, the ion fan 146 may be provided as any suitable fan or air-motivating member. In the illustrated embodiments, the ion fan 146 is shown as an axial fan rotatably mounted within the body housing 126 of the ion generator 124. Nonetheless, in additional or alternative embodiments, the ion fan 146 may include or be provided as a centrifugal fan, mixed-flow fan, cross-flow fan, etc., as would be understood. A fan motor (not pictured) may be included to motivate fan rotation, as would be understood. The ion fan 146 may be provided as a single-speed fan or, alternatively, as a variable speed fan in which the speed of fan rotation, and thereby the velocity of air motivated by the same, may be varied according to one or more predetermined factors.

In certain embodiments, a controller 148 is included with the ion generator 124 or grinder apparatus 100 in general (e.g., to execute or direct grinding operations for the grinder apparatus 100). For instance, the controller 148 may be attached (e.g., directly or, alternatively, indirectly) in operative (e.g., wired or wireless) communication with the grinder motor 114, ion generator 124, ion sensor 144, ion fan 146, or one or more other elements of the grinder apparatus 100.

Figure 4:
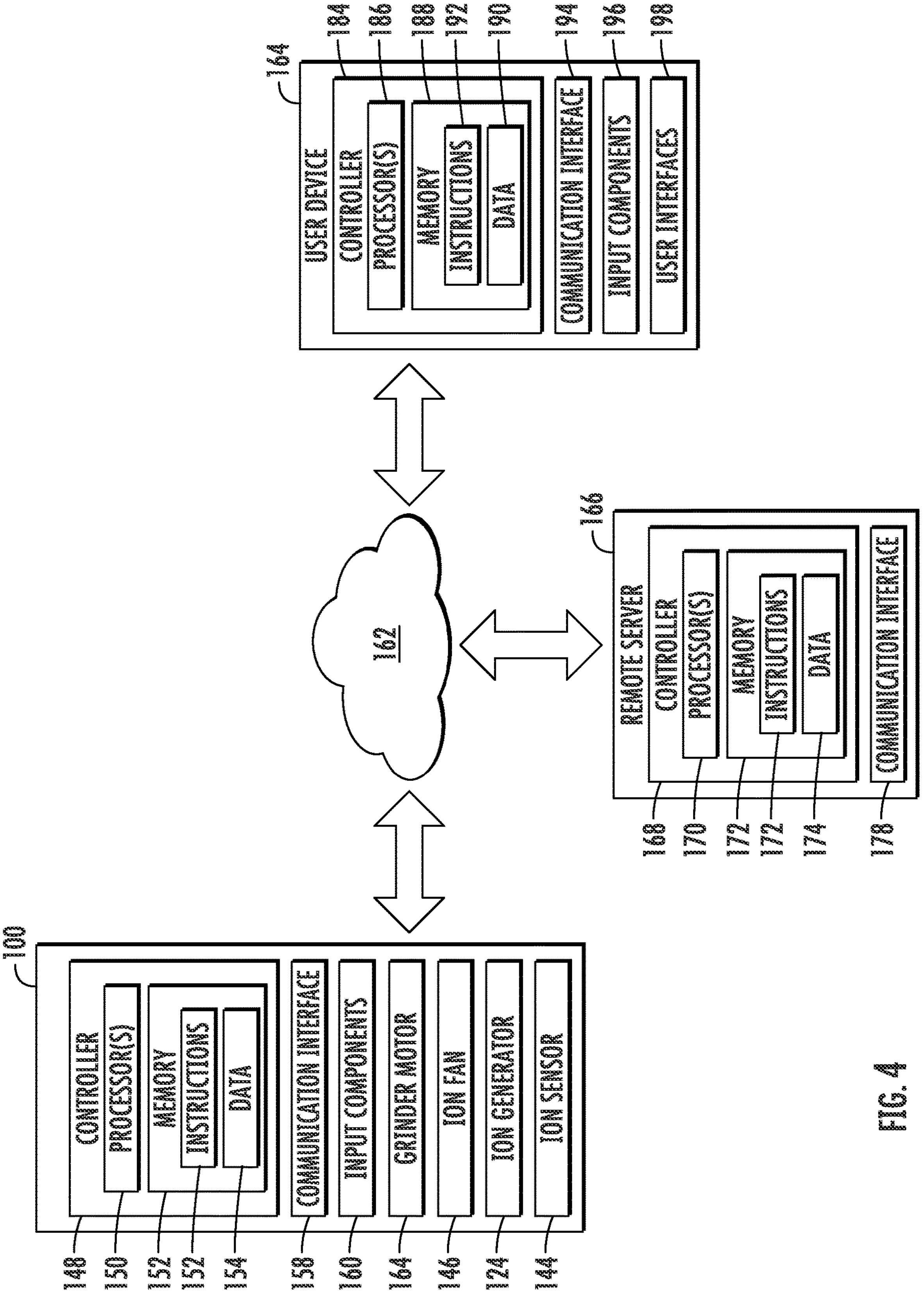
FIG. 4 provides a schematic view of a computing system for a grinder apparatus according to exemplary embodiments of the present disclosure.
Figure 5:
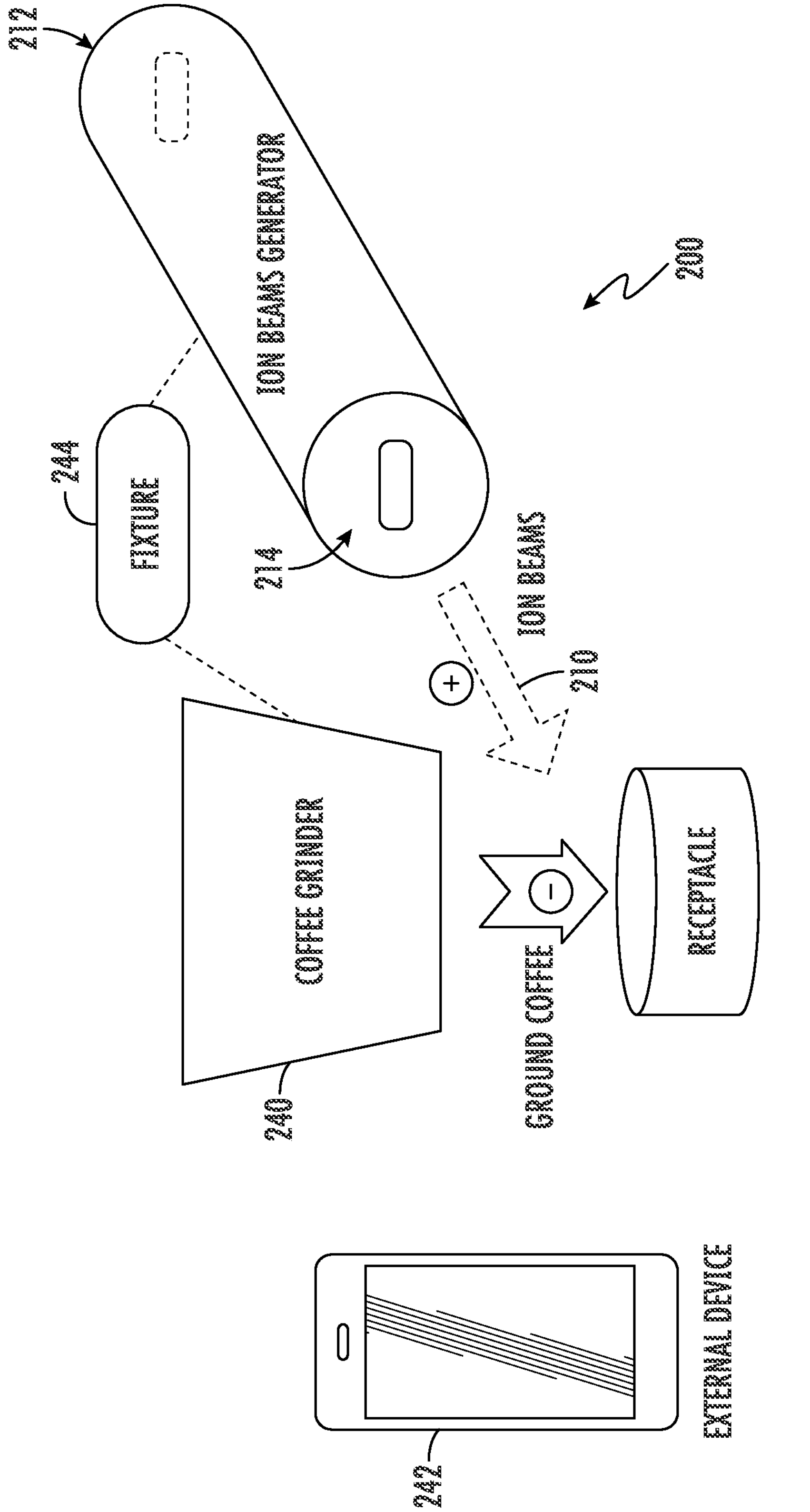
FIG. 5 provides a schematic view of a system for eliminating static on coffee ground using ion beams according to exemplary embodiments of the present disclosure.
Figure 6:
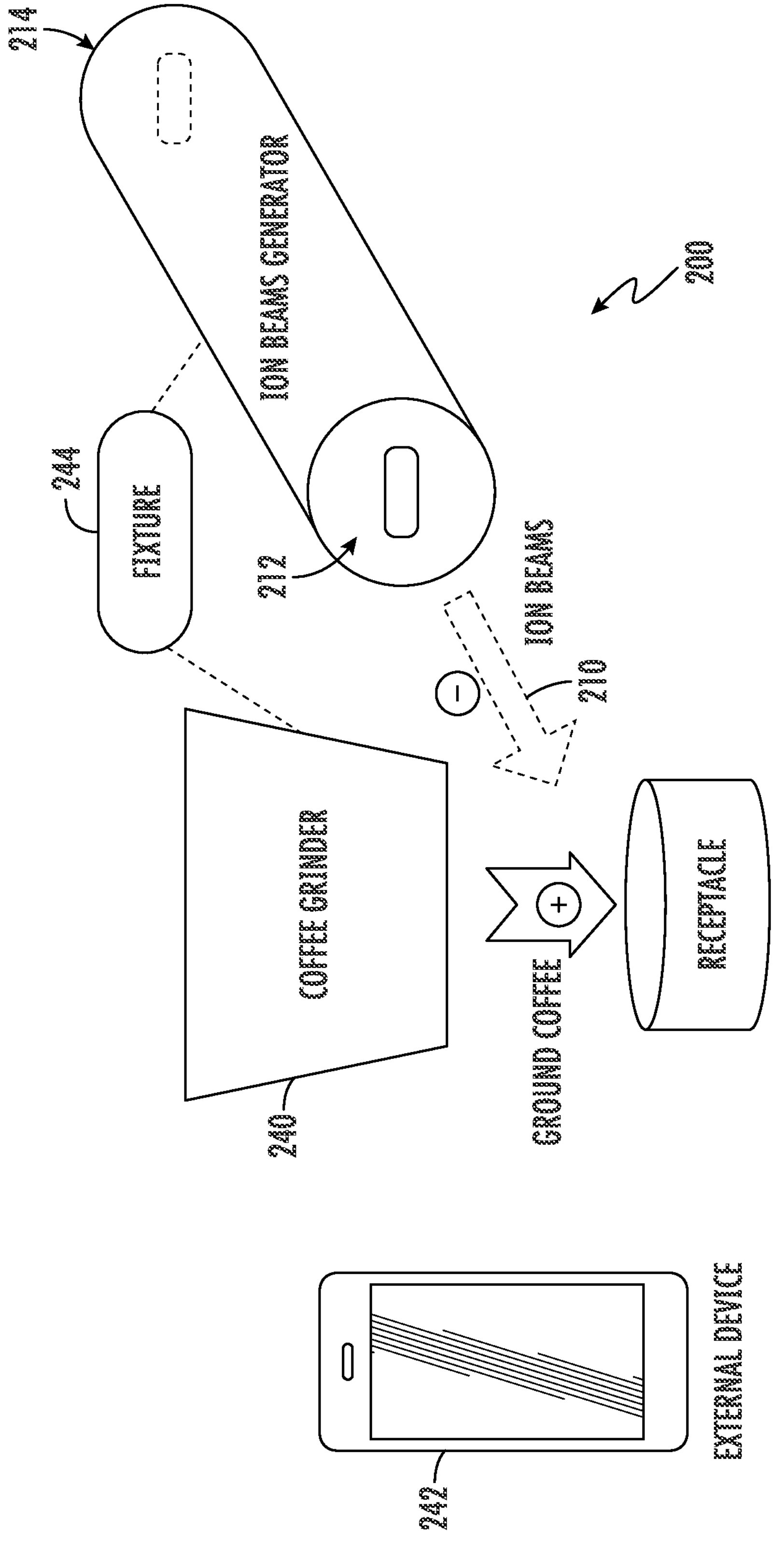
FIG. 6 provides another schematic view of the exemplary system of FIG. 5.
Figure 7:
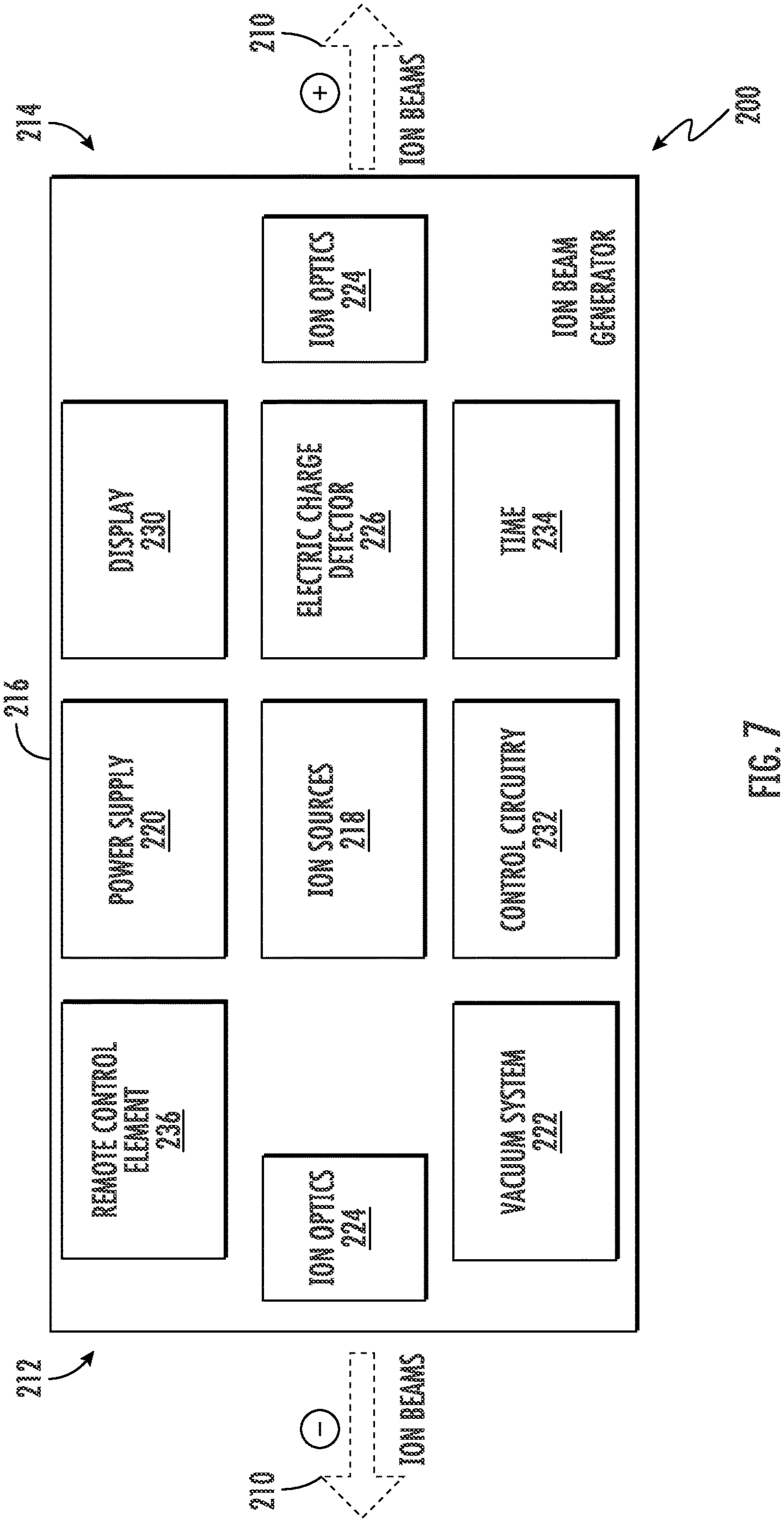
FIG. 7 provides a schematic view of an ion beam generator according to exemplary embodiments of the present disclosure.
Figure 8:
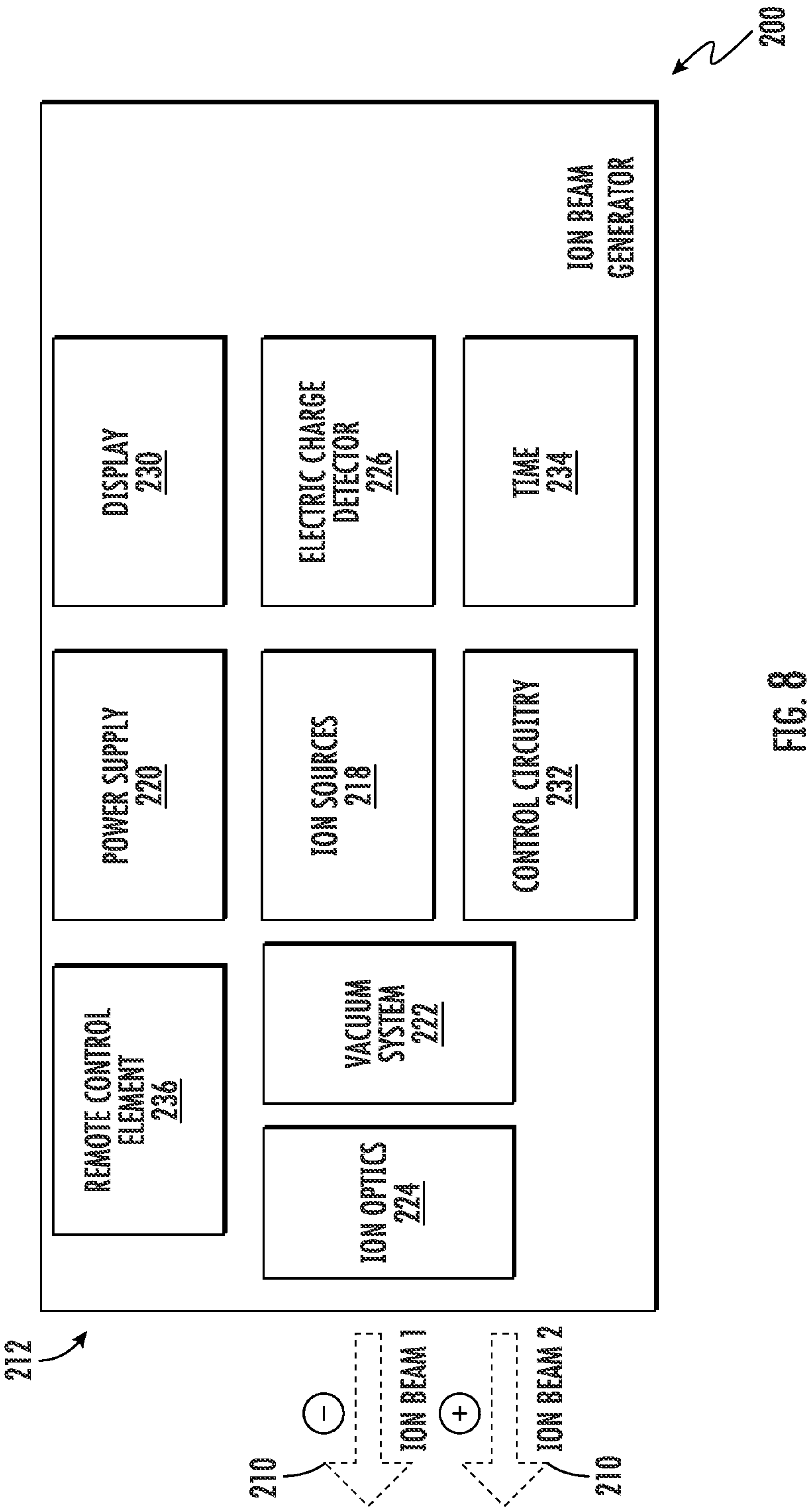
FIG. 8 provides a schematic view of an ion beam generator according to exemplary embodiments of the present disclosure.

Turning especially to FIG. 4, controller 148 may include one or more processors 150 and one or more memory devices 152 (i.e., memory). The one or more processors 150 can be any suitable processing device (e.g., a processor core, a microprocessor, an ASIC, a FPGA, a microcontroller, etc.) and can be one processor or a plurality of processors that are operatively connected. The memory device 152 can include one or more non-transitory computer-readable storage mediums, such as RAM, ROM, EEPROM, EPROM, flash memory device, magnetic disks, etc., and combinations thereof. The memory devices 152 can store data 154 and instructions 156 that are executed by the processor 150 to cause grinder apparatus 100 to perform operations. The memory devices 152 may also include data 154, such as captured image data, notification or message data, etc., that can be retrieved, manipulated, created, or stored by processor 150.

It is noted that, although not pictured, a suitable power source (e.g., battery, AC voltage port, etc.) could be provided in electrical communication with grinder apparatus 100 to electrically power the same (e.g., as is generally understood).

The controller 148 can also include one or more user input components 160 that receives user input. For example, the user input component 160 can be a touch-sensitive component (e.g., a touch-sensitive display screen or a touch pad) that is sensitive to the touch of a user input object (e.g., a finger or a stylus). The touch-sensitive component can optionally serve to implement a virtual keyboard. Other example user input components 160 include a microphone, a tactile or physical button, a traditional keyboard, or other means by which a user can provide user input.

In some embodiments, controller 148 includes a communications interface 158 such that grinder apparatus 100 can connect to and communicate over one or more networks (e.g., network 162) with one or more network nodes. Communications interface 158 can be an onboard component of controller 148 or it can be a separate, off board component. In some implementations, the communications interface 158 may include for example, one or more of a communications controller, receiver, transceiver, transmitter, port, conductors, software and/or hardware for communicating data/information. Controller 148 can also include one or more transmitting, receiving, or transceiving components for transmitting/receiving communications with other devices communicatively coupled with grinder apparatus 100. Additionally or alternatively, one or more transmitting, receiving, or transceiving components can be located off board controller 148.

Network 162 can be any suitable type of network, such as a local area network (e.g., intranet), wide area network (e.g., internet), low power wireless networks [e.g., Bluetooth Low Energy (BLE)], or some combination thereof and can include any number of wired or wireless links. In general, communication over network 162 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

In some embodiments, a remote server 166, such as a web server, is in operable communication with grinder apparatus 100. Additionally or alternatively, the server 166 can be used to host an information database. The server can be implemented using any suitable computing device(s). The remote server 166 may include a server controller 168 include one or more processors 170 and one or more memory devices 172 (i.e., memory). The one or more processors 170 can be any suitable processing device (e.g., a processor core, a microprocessor, an ASIC, a FPGA, a microcontroller, etc.) and can be one processor or a plurality of processors that are operatively connected. The memory device 172 can include one or more non-transitory computer-readable storage mediums, such as RAM, ROM, EEPROM, EPROM, flash memory devices, magnetic disks, etc., and combinations thereof. The memory devices 172 can store data 174 and instructions 176 which are executed by the processor 170 to cause remote server 166 to perform operations.

The memory devices 172 may also include data 174 that can be retrieved, manipulated, created, or stored by processor 170. The data 174 can be stored in one or more databases. The one or more databases can be connected to remote server 166 by a high bandwidth LAN or WAN, or can also be connected to remote server 166 through network 162. The one or more databases can be split up so that they are located in multiple locales.

Remote server 166 includes a communications interface 178 such that interactive remote server 166 can connect to and communicate over one or more networks (e.g., network 162) with one or more network nodes. Communications interface 178 can be an onboard component or it can be a separate, off board component. In some implementations, the communication interface 178 may include for example, one or more of a communications controller, receiver, transceiver, transmitter, port, conductors, software and/or hardware for communicating data/information. In turn, remote server 166 can exchange data with one or more nodes over the network 162. In particular, remote server 166 can exchange data with grinder apparatus 100. It is understood that remote server 166 may further exchange data with any number of client devices over the network 162. The client devices can be any suitable type of computing device, such as a general-purpose computer, special purpose computer, laptop, desktop, integrated circuit, mobile device, smartphone, tablet, or other suitable computing device.

In certain embodiments, a user device 164 is communicatively coupled with network 162 such that user device 164 can communicate with grinder apparatus 100. User device 164 can communicate directly with grinder apparatus 100 via network 162. Alternatively, a user can communicate indirectly with grinder apparatus 100 by communicating via network 162 with remote server 166, which in turn communicates with grinder apparatus 100 via network 162. Moreover, a user can be in communication with user device 164 such that the user can communicate with grinder apparatus 100 via user device 164.

User device 164 can be any type of device, such as, for example, a personal computing device (e.g., laptop or desktop), a mobile computing device (e.g., smartphone or tablet), a gaming console or controller, a wearable computing device, an embedded computing device, a remote, or any other suitable type of user computing device. User device 164 can include one or more user device controllers 184. Device controller 184 can include one or more processors 186 and one or more memory devices 188. The one or more processors 186 can be any suitable processing device (e.g., a processor core, a microprocessor, an ASIC, a FPGA, a controller, a microcontroller, etc.) and can be one processor or a plurality of processors that are operatively connected. The memory device (i.e., memory) can include one or more non-transitory computer-readable storage mediums, such as RAM, ROM, EEPROM, EPROM, flash memory devices, magnetic disks, etc., and combinations thereof. The memory can store data and instructions which are executed by the processor 186 to cause user device 164 to perform operations. Device controller 184 may include a user device communications interface 194 such that user device 164 can connect to and communicate over one or more networks (e.g., network 162) with one or more network nodes. Communications interface 194 can be an onboard component of device controller 184 or it can be a separate, off board component. In some implementations, the communications interface 194 may include for example, one or more of a communications controller, receiver, transceiver, transmitter, port, conductors, software and/or hardware for communicating data/information. Device controller 184 can also include one or more transmitting, receiving, or transceiving components for transmitting/receiving communications with other devices communicatively coupled with user device 164. Additionally or alternatively, one or more transmitting, receiving, or transceiving components can be located off board device controller 184.

The device controller 184 or user device 164 can also include one or more user input components 196 that receives user input. For example, the user input component 196 can be a touch-sensitive component (e.g., a touch-sensitive display screen or a touch pad) that is sensitive to the touch of a user input object (e.g., a finger or a stylus). The touch-sensitive component can optionally serve to implement a virtual keyboard. Other example user input components include a microphone, a tactile or physical button, a traditional keyboard, or other means by which a user can provide user input.

In some implementations, the controller 184 can store or provide one or more user interfaces 198, which may be associated with one or more applications. The one or more user interfaces 198 can be configured to receive inputs or provide data for presentation or display (e.g., image data, text data, audio data, one or more user interface elements, an augmented-reality experience, a virtual reality experience, or other data for display). The user interfaces 198 may be associated with one or more other computing systems (e.g., a server computing system or third party computing system). The user interfaces 198 can include a viewfinder interface, a search interface, a generative model interface, a social media interface, or a media content gallery interface.

As noted above, controller 148 of grinder apparatus 100 may be in operative communication with ion generator 124, ion sensor 144, or ion fan 146. In some embodiments, controller 148 is configured to control (e.g., selectively vary) a polarity of ions produced by the ion generator 124. Specifically, controller 148 may be configured to control the polarity of the output of the ions by directing the ion generator 124 based on one or more received detected conditions.

As an example, input signals for varying or selecting the polarity of ions output by the ion generator 124 may be based on input signals regarding detected polarity or charge conditions (e.g., received from the ion sensor 144). In particular, the input signals may be provided as an electric field signal (e.g., described above). Thus, the polarity of ions produced by the ion generator 124 may be based on the detection output from the electric charge detector or ion sensor 144. For instance, in response to detecting negative or positive static charges in the air, the ion generator 124 may switch a direction of an electric field inside the ion generator 124 to emit positive or negative ions to neutralize the static charges. Additionally or alternatively, in response to detecting negative or positive static charges in the air, the ion generator 124 may switch a source of the ion generator 124 to emit positive or negative ions to neutralize the static charges. In some implementations, the controller 148 may dynamically adjust the polarity of the ions, a flow rate of the ions, an amount of the ions emitted, or any other suitable characteristics of the ions depending on the output of the electric charge detector or ion sensor 144. In some other implementations, a user of the grinder apparatus 100 may adjust one or more characteristics of the ions manually through an interface on the grinder apparatus 100 or another remote device (e.g., on a software application running on the user's smartphone).

As an additional or alternative example, input signals varying or selecting the polarity of ions output by the ion generator 124 may be based on input signals used for one or more determinations regarding one or more properties associated with the coffee beans being ground. In certain embodiments, the bean type may be determined. For instance, beans of different roast levels (e.g., relatively lighter or relatively darker roast levels), fruit-removal processing (e.g., natural, washed, or honey-processed beans), or geographic location of origins may be determined to typically result in either predominately positive or, alternatively, predominately negative ionization. In turn, a determination may be made regarding the bean type (e.g., roast level, fruit-removal processing, geographic origin, etc.). In some such embodiments, the controller 148 is configured to determine the bean type (e.g., based on one or more user inputs or detected attributes of the beans). For instance, a user may manually input the bean type (e.g., at the user device 164), which may in turn be provided to the controller 148 (e.g., as a remote signal provided from the user device 164, as described above). In some embodiments, a water content in the coffee bean may be determined.

Based on the determined one or more properties associated with the coffee beans (e.g., bean type), the controller 148 may selective positive or negative ions to be produced (e.g., by referencing a programmed chart, graph, or look-up table correlating one or more factors regarding bean type to ionization). Thus, the polarity of ions produced by the ion generator 124 may be based on the determined bean type. As an example, in response to determining a relatively dark roast (e.g., greater than a predetermined Agtron-color threshold), the ion generator 124 may be directed to emit negative ions. By contrast, in response to determining a relative light roast (e.g., less than or equal to a predetermined Agtron-color threshold), the ion generator 124 may be directed to produce positive ions. In some implementations, the controller 148 may dynamically adjust the polarity of the ions depending on the output of the electric charge detector or ion sensor 144.

Separate from or in addition to varying polarity of ions, controller 148 may be configured to vary a rotational speed of the ion fan 146. For instance, the controller 148 may be configured to control a rotational speed of the ion fan 146 from a plurality of rotational speeds between discrete maximum and minimum rotational speeds. The speeds may be manually varied (e.g., based on a direct user input) or automatically varied based on one or more detected conditions (e.g., rotational speed of the grinder motor 114, bean type, etc.).

Turning now to FIGS. 5 through 8, the present disclosure is directed to an apparatus 200 that generates one or more types of ion beam 210 to neutralize the static electricity on the ground coffee. In some implementations, the ion beam 210 generator 200 may generate negative ions (e.g., negative ion beams 210) on a first distal end 212 and positive ions (e.g., positive ion beams 210) on a second distal end 214. In some implementations, the ion beam generator 200 may direct at least one of the generated ion beams 210 towards the coffee ground. As an example, the majority of the ground coffee static may be positively charged. Therefore, the first distal end 212 of the ion beam generator 200 could generate negative ions to neutralize the positively charged coffee particles during coffee ground exiting the chute. As another example, dark roasted ground coffee may be negatively charged, and the second distal end 214 of the ion beam generator 200 could generate positive ions to neutralize the charged coffee particles during coffee ground exiting the chute.

The ion beam generator 200 includes a body 216, an ion source 218, a power supply 220, a vacuum system 222, and ion optics 224. The body 216 may be an elongated body 216 with two distal ends. In some implementations, one distal end 214 emits positive ions and the other distal end 212 emits negative ions to remove negative static and positive static, respectively. For example, an electric field generator may create an electric field along the elongated body 216, which separate the positive and negative ions to each distal end. In some other implementations, one distal end 212 may electively emit positive or negative ions to remove negative static and positive static in the environment. In some implementations, the body 216 may include brush tip. In some other implementations, the body 216 may include metal tip.

The ion source 218 produces the ion beam 210, and can be made from various materials such as tungsten, graphite, or ceramics. In some implementations, the ion source 218 is heated to produce a stream of positive and negative ions. The voltage power supply 220 provides the energy necessary to accelerate the ions to high speeds (e.g., a threshold speed), which can be DC or AC supplied. The vacuum system 222 maintains a low-pressure environment inside the body 216 to prevent interference from air molecules and to ensure that the ions can travel freely without colliding with other particles. In some implementations, the vacuum system 222 includes a vacuum pump and one or more vacuum chambers configured to transport the positive ions and/or the negative ions. Ion optics 224 may be used to manipulate (e.g., focus, collimate, etc.) the ion beam 210, which can include electrostatic lenses, which use electric fields to manipulate the ions.

In some implementations, the ion beam generator 200 may include an electric charge detector 226 that is configured to detect the type of static charge in the air (e.g., outside the apparatus) and provide a detection output. The electric charge detector 226 may include one or more probes and detection circuitry. A probe is the sensing element used to collect electric charges from the surrounding air. For example, the probe may include a sharp point made of a conductive material such as metal. The detection circuitry is configured to receive an electrical signal from the probe and to provide an output signal. For example, the detection circuitry may include an amplification circuitry such as operational amplifier (op-amp) or a field-effect transistor (FET) amplifier. In some implementations, the ion beam generator 200 may include a display 230 that is configured to output a visual output indicating the type of static charge in the air or on the coffee ground, so that a user of the ion beam generator 200 may utilize a proper distal end of the ion beam generator 200 to remove the static on the coffee ground.

In some implementations, the ion beam generator 200 may include a control circuitry 232 that is configured to control an output of the one or more ion beams 210 based on the detection output from the electric charge detector 226. For example, the control circuitry 232 is configured to generate appropriate type of ions based on the detection result. As an example, in response to detecting negative or positive static charges in the air, the ion beam generator 200 may switch a direction of an electric field inside the ion beam generator 200 to emit positive or negative ions to neutralize the static charges. As another example, in response to detecting negative or positive static charges in the air, the ion beam generator 200 may switch a source of the ion beam generator 200 to emit positive or negative ions to neutralize the static charges. In some implementations, the control circuitry 232 may dynamically adjust the polarity of the ion beam 210 depending on the output of the electric charge detector 226.

In some implementations, the electric charge detector 226 may be configured to detect a balance of the static and the emitted ions in the environment, and the control circuitry 232 may be configured to emit a proper composition of ions based on the detection result (e.g., detected balance). For example, by receiving the emitted ions at a first ion concentration, the static of the coffee ground may decrease over time. The electric charge detector 226 may detect such decrease, and the control circuitry 232 may emit ions at a second ion concentration that is lower than the first ion concentration. Accordingly, the static of the coffee ground may be reduced/eliminated in a dynamic manner.

In some implementations, the ion beam generator 200 may include a timer 234 that is configured to stop the emission of the ion beam 210 after a predetermined time period.

In some implementations, the ion beam generator 200 may include a remote control element 236 such as a wireless or Bluetooth communication module, where the ion beam generator 200 may communicate with and be controlled (e.g., turned on/off, emit ions with certain polarity, etc.) by an external device (e.g., a coffee grinder 240 or a smartphone 242). For example, a coffee grinder 240 may be wirelessly connected with the ion beam generator 200, and may be configured to turn on the ion beam generator 200 when a coffee-grinding process is initiated, and turn off the ion beam generator 200 when the coffee-grinding process is stopped.

In some implementations, the ion beam generator 200 may include one or more fixtures 244 configured to attach to a coffee grinder 240.

This written description uses examples of the disclosure, including the best mode, and also to enable any person skilled in the art to practice the disclosure, including making and using any devices or systems and performing any incorporated methods.

What is claimed is:

1. A grinder apparatus comprising:

a grinder body defining an intake passage to receive coffee beans therein and an outlet aperture;

a burr set disposed within the grinder body in fluid communication between the intake passage and the outlet aperture to grind the coffee beans into coffee grounds output at the outlet aperture;

an ion generator attached to the grinder body to produce ions therefor, the ion generator comprising an ion source in fluid communication with the grinder body;

an ion fan in fluid communication with the ion source to motivate the ions therefrom; and a feeder cup disposed on the grinder body, the intake passage extending between the feeder cup and the burr set, wherein the ion generator is in fluid communication with the grinder body along the intake passage upstream from the burr set to direct ions from the ion source to mix with the coffee beans prior to reaching the burr set.

2. The grinder apparatus of claim 1, wherein the ion fan is disposed upstream from the outlet aperture.

3. The grinder apparatus of claim 1, wherein the grinder body defines an inlet aperture upstream from the intake passage and through which the coffee beans are received, and wherein the ion generator defines an airflow passage outside of the grinder body and in fluid parallel to the inlet aperture upstream from the outlet aperture to direct the ions to the grinder body apart from the inlet aperture.

4. The grinder apparatus of claim 3, wherein the ion fan is disposed along the airflow passage.

5. The grinder apparatus of claim 4, wherein the ion source is disposed along the airflow passage.

6. The grinder apparatus of claim 1, further comprising a controller operably connected to the ion fan, the controller being configured to control a rotational speed of the ion fan from a plurality of rotational speeds between discrete maximum and minimum rotational speeds.

7. The grinder apparatus of claim 1, further comprising an ion sensor disposed downstream from the burr set to detect polarity of the coffee grounds.

8. The grinder apparatus of claim 7, further comprising a controller operably connected to the ion sensor and the ion generator, the controller being configured to control a polarity of the ions produced by the ion generator based on the detected polarity of the coffee grounds.

9. The grinder apparatus of claim 8, wherein the controller is configured to dynamically control one or more properties associated with the ions based on detection outputs of the ion sensor over time, and wherein the one or more properties include the polarity of the ions, a flow rate of the ions, or an amount of the ions produced by the ion generator.

10. The grinder apparatus of claim 7, further comprising a controller operably connected to the ion sensor and the ion generator, the controller being configured to determine one or more properties associated with the coffee beans, and control a polarity of the ions produced by the ion generator based on the determined one or more properties, wherein the one or more properties include a bean type of the coffee beans or a water content of the coffee beans.

11. A grinder apparatus comprising:

a grinder body defining an intake passage to receive coffee beans therein and an outlet aperture;

a burr set disposed within the grinder body below the intake passage and upstream from the outlet aperture to grind the coffee beans into coffee grounds output at the outlet aperture;

an ion generator attached to the grinder body at the intake passage to produce ions, the ion generator comprising an ion source in fluid communication with the intake passage to produce ions introduced with the received coffee beans; and a feeder cup disposed on the grinder body, the intake passage extending between the feeder cup and the burr set, wherein the ion generator is in fluid communication with the grinder body along the intake passage upstream from the burr set to direct ions from the ion source to mix with the coffee beans prior to reaching the burr set.

12. The grinder apparatus of claim 11, further comprising:

an ion fan disposed upstream from the outlet aperture and in fluid communication with the ion source to motivate the ions therefrom.

13. The grinder apparatus of claim 12, wherein the grinder body defines an inlet aperture upstream from the intake passage and through which the coffee beans are received, and wherein the ion generator defines an airflow passage outside of the grinder body and in fluid parallel to the inlet aperture upstream from the outlet aperture to direct the ions to the grinder body apart from the inlet aperture.

14. The grinder apparatus of claim 13, wherein the ion fan is disposed along the airflow passage.

15. The grinder apparatus of claim 14, further comprising a controller operably connected to the ion fan, the controller being configured to control a rotational speed of the ion fan from a plurality of rotational speeds between discrete maximum and minimum rotational speeds.

16. The grinder apparatus of claim 11, further comprising an ion sensor disposed downstream from the burr set to detect polarity of the coffee grounds, wherein the ion sensor is in operable communication with the ion generator, wherein the ion generator is configured to select a polarity of the ions based on the detected polarity of the coffee grounds at the ion sensor.

17. The grinder apparatus of claim 16, further comprising a controller operably connected to the ion sensor and the ion generator, the controller being configured to control a polarity of the ions produced by the ion generator based on the detected polarity of the coffee grounds.

18. The grinder apparatus of claim 16, further comprising a controller operably connected to the ion sensor and the ion generator, the controller being configured to determine one or more properties associated with the coffee beans, and control a polarity of the ions produced by the ion generator based on the determined one or more properties, wherein the one or more properties include a bean type of the coffee beans or a water content of the coffee beans.

* * * * *